United States Patent
Yang

(10) Patent No.: US 6,711,921 B1
(45) Date of Patent: Mar. 30, 2004

(54) LOCKING DEVICE FOR A PDA AND A CHARGING BASE FOR THE PDA

(75) Inventor: Kuo-Tsung Yang, No. 9, Alley 10, Lane 321, Hsinming Rd., Taipei (TW)

(73) Assignees: Kuo-Tsung Yang, Taipei (TW); Jin Tay Industries Co., Ltd., Taipei Hsien (TW)

( * ) Notice: Subject to any disclaimer, the term of this patent is extended or adjusted under 35 U.S.C. 154(b) by 0 days.

(21) Appl. No.: 10/330,398

(22) Filed: Dec. 27, 2002

(30) Foreign Application Priority Data

Sep. 30, 2002 (TW) ...................... 91215443 U

(51) Int. Cl.$^7$ .......................... E05B 69/00; E05B 73/00
(52) U.S. Cl. ................. 70/58; 70/158; 70/159; 70/163; 70/170; 70/30; 248/551
(58) Field of Search ............. 70/158–173, 58, 70/30, 63; 248/551–553

(56) References Cited

U.S. PATENT DOCUMENTS

| | | | | |
|---|---|---|---|---|
| 4,856,305 A | * | 8/1989 | Adams ........................ | 70/58 |
| 5,052,199 A | * | 10/1991 | Derman ....................... | 70/58 |
| 5,531,082 A | * | 7/1996 | Wolk et al. .................. | 70/63 |
| 5,645,261 A | * | 7/1997 | Glynn ......................... | 248/551 |
| 5,786,759 A | * | 7/1998 | Ling .......................... | 340/542 |
| 5,816,076 A | * | 10/1998 | Biedermann et al. ......... | 70/57 |
| 5,832,752 A | * | 11/1998 | Zeller ......................... | 70/30 |
| 5,836,183 A | * | 11/1998 | Derman ....................... | 70/58 |
| 6,089,054 A | * | 7/2000 | Stukas et al. ................ | 70/18 |
| 6,185,964 B1 | * | 2/2001 | Addiego ....................... | 70/58 |
| 6,192,719 B1 | * | 2/2001 | Stukas et al. ................ | 70/18 |
| 6,192,722 B1 | * | 2/2001 | Galant ......................... | 70/58 |
| 6,212,921 B1 | * | 4/2001 | Knighton ...................... | 70/58 |
| 6,216,499 B1 | * | 4/2001 | Ronberg et al. .............. | 70/58 |
| 6,298,695 B1 | * | 10/2001 | Vezina et al. ................ | 70/58 |
| 6,308,928 B1 | * | 10/2001 | Galant ......................... | 248/553 |
| 6,408,660 B1 | * | 6/2002 | Lai ............................. | 70/30 |
| 6,443,417 B2 | * | 9/2002 | Galant ......................... | 248/553 |
| 6,513,349 B1 | * | 2/2003 | Miao ........................... | 70/57 |
| 6,581,420 B1 | * | 6/2003 | Ling et al. .................... | 70/58 |
| 2002/0113185 A1 | * | 8/2002 | Ziegler ........................ | 248/309.1 |
| 2002/0157431 A1 | * | 10/2002 | Lurie et al. ................... | 70/58 |
| 2003/0089141 A1 | * | 5/2003 | Edwards et al. .............. | 70/18 |
| 2003/0106862 A1 | * | 6/2003 | McMurray et al. ........... | 211/5 |
| 2003/0164010 A1 | * | 9/2003 | Galant ......................... | 70/58 |

* cited by examiner

Primary Examiner—John B. Walsh
(74) Attorney, Agent, or Firm—Alan Kamrath; Rider Bennett, LLP

(57) ABSTRACT

A locking device has a base, a positioning element, a positioning frame, a cable and a lock assembly. The base has a positioning tab and a squeezing device. The positioning element is attached to the bottom of the base configured for the base being attached to an object. The positioning frame is pivotally attached to the base and has a telescopic body. The cable is moveably received in the base and has one end extending out from the base and provided by a hook to connect to the positioning frame. The lock assembly is mounted in the base and detachably locks the cable. Accordingly, a PDA and a charging base can be securely held on the base with the positioning frame and the cable. This can keep the PDA and the charging base from being unauthorizedly moved.

17 Claims, 7 Drawing Sheets

LOCKING DEVICE FOR A PDA AND A CHARGING BASE FOR THE PDA

BACKGROUND OF THE INVENTION

1. Field of the Invention

The present invention relates to a locking device, and more particularly to a locking device for a PDA (personal digital assistant) and a charging base for the PDA and that can securely hold the PDA and the charging base and keep them from being unauthorizedly moved.

2. Description of Related Art

A PDA (personal digital assistant) has multiple capabilities of memorizing the personal information of the user, transforming or downloading data to or from a computer to assist the user to deal with personal matters, and so on. For keeping the PDA available for use over a long time continuously, a chargeable battery is mounted in the PDA to provide the electric power to the PDA when the user uses the PDA outdoors. To charge the battery, a charging base is provided and is connected to the electric power, such that the battery in the PDA is charged through the charging base.

However, there is no locking device for the PDA and the charging device, whereby anybody can unauthorizedly move or take the valuable PDA and the charging base when the user temporary goes away from the PDA and the charging base. This will not only cause the loss of money because of the value of the PDA and the charging base themselves, but this also causes serious loss because of the personal or commercial information stored in the PDA.

To overcome the shortcomings, the present invention tends to provide a locking device for a PDA to mitigate or obviate the aforementioned problems.

SUMMARY OF THE INVENTION

The main objective of the invention is to provide a locking device for a PDA and a charging base and that can securely attach the PDA with the charging base to an object to keep anybody unauthorizedly moving or taking the PDA. The locking device has a base, a positioning element, a positioning frame, a cable and a lock assembly. The base has a positioning tab and a squeezing device to hold the charging base in cooperation with the positioning tab. The positioning element is attached to the bottom of the base configured for the base being attached to an object with the positioning element. The positioning frame is pivotally attached to the base and is adapted for holding the PDA. The cable is moveably received in the base and has one end extending out from the base and provided by a hook to connect to the positioning frame. The lock assembly is mounted in the base and detachably locks the cable. With such a locking device, the PDA and the charging base can be securely held on the base with the positioning frame and the cable before the lock device is unlocked. This can keep the PDA and the charging base from being unauthorizedly and arbitrarily moved.

Other objects, advantages and novel features of the invention will become more apparent from the following detailed description when taken in conjunction with the accompanying drawings.

DETAILED DESCRIPTION OF PREFERRED EMBODIMENT

Figure 1:
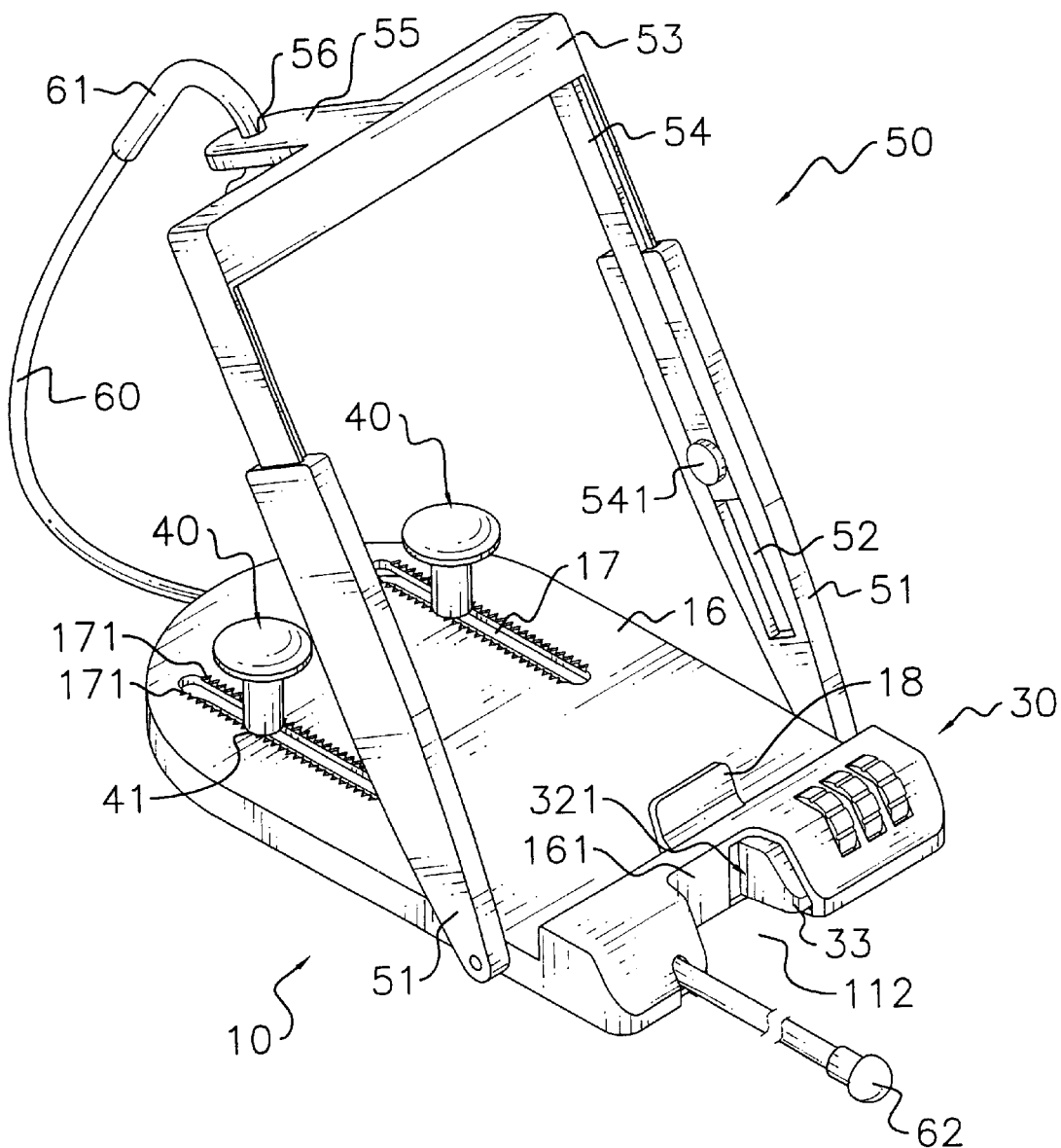
FIG. 1 is a perspective view of a locking device for a PDA and a charging device in accordance with the present invention.
Figure 2:
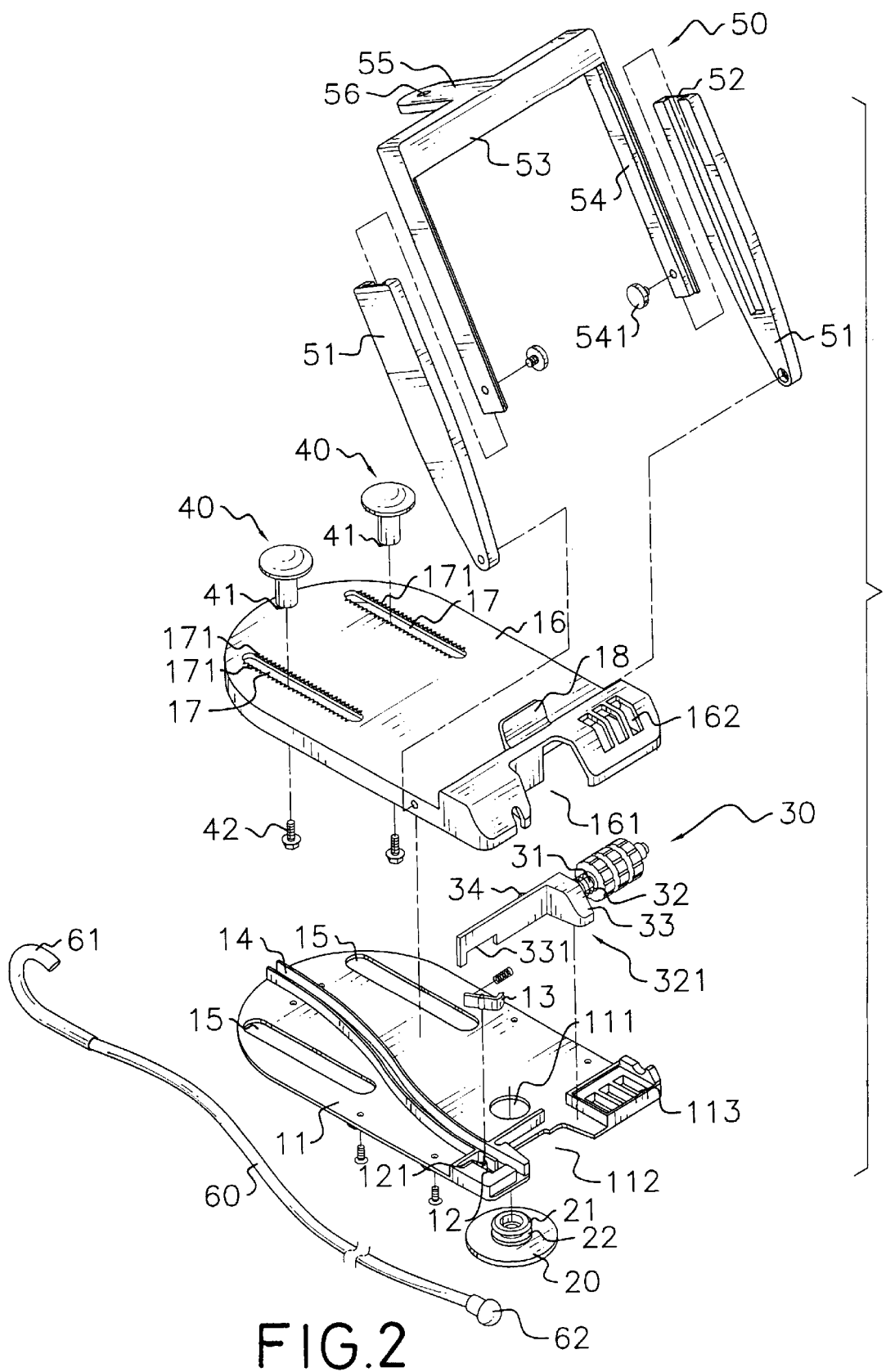
FIG. 2 is an exploded perspective view of the locking device in FIG. 1.
Figure 3:
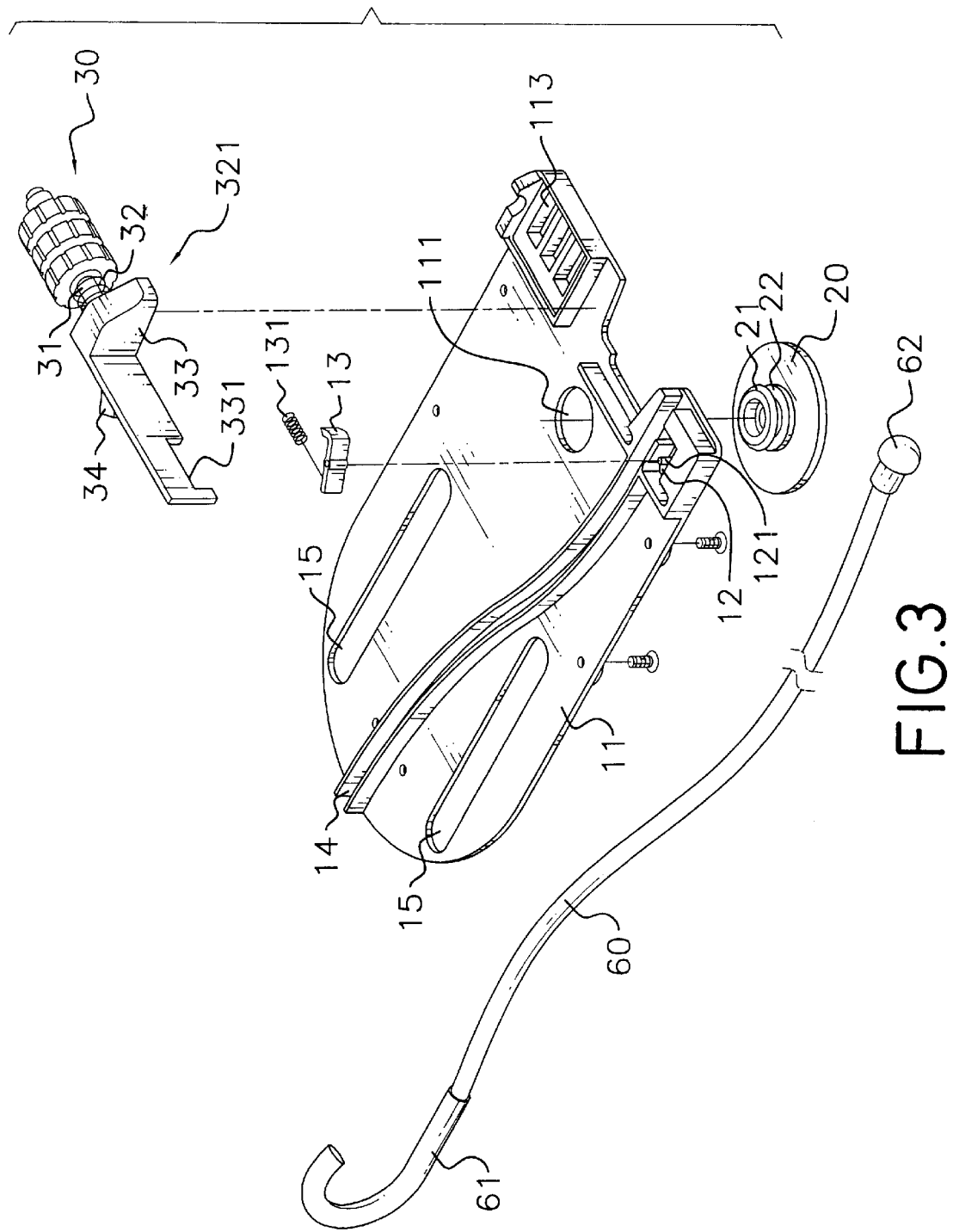
FIG. 3 is an exploded perspective view of the bottom plate, the positioning element, the cable and the lock assembly of the locking device in FIG. 1.

With reference to FIGS. 1 to 3, a locking device for a PDA (personal digital assistant) and a charging base for the PDA in accordance with the present invention comprises a base (10), a positioning element (20), a positioning frame (50), a cable (60) and a lock assembly (30). The base (10) has a top and a bottom and is composed of a bottom plate (11) with a top and an upper cover (16) with a top and a bottom attached to the bottom plate (11). The bottom plate (11) has a front notch (112) defined in on end of the bottom plate (11), and the upper cover (16) has a front notch (161) defined in one end of the upper cover (16) and corresponding to the front notch (112) in the bottom plate (11). A through hole (111) is defined through the bottom plate (11).

A positioning tab (18) is formed on the top of the upper cover (16). A squeezing device is moveably mounted on the top of the upper cover (16) to be adapted to hold the charging base in cooperation with the positioning tab (18). In practice, the squeezing device comprises two positioning knobs (40) moveably mounted on the top of the upper cover (16) in a parallel direction. Two parallel slots (17) are defined in the upper cover (16), and the two positioning knobs (40) are respectively slidably attached to the upper cover (16) along the slots (17). A screw (42) is screwed to the bottom of each respective positioning knob (40) and has a head abutting the bottom of the upper cover (16). With the abutment of the head of the screw (42) and the bottom of the upper cover (16), each positioning knob (40) can be securely positioned on the top of the upper cover (16). When the screw (42) is released to make the head away from the bottom of the upper cover (16), the positioning knob (40) can move relative to the upper cover (16) along the slot (17). Two elongated holes (15) are defined in the bottom plate (11) and respectively correspond to the slots (17) in the upper cover (16). Accordingly, a tool, such as a screwdriver can pass through the elongated hole (15) to lock or unlock the screw (42).

In addition, multiple dents (171) are defined in the upper cover (16) along two sides of each respective slot (17). A tooth (41) is formed on each side of each respective positioning knob (40) to engage with one of the dents (171) on a corresponding side of the corresponding one of the slots (17) in the upper cover (16). With the engagement between the tooth (41) and one of the dents (171), the position of the positioning knob (40) is held.

The positioning element (20) is attached to the bottom of the bottom plate (11) and is configured for the base (10) being attached to an object with the positioning element (20). In practice, the positioning element (20) is a suction disk with a post (21) extending upward from the suction disk. The post (21) extends through the through hole (111) in the bottom plate (11) and has a groove (22) defined around the post (21).

The positioning frame (50) is pivotally attached to the upper cover (16) and is adapted for holding the PDA. The positioning frame (50) has a telescopic body comprising two pivotal arms (51), two slidable arms (54) and a positioning flange (53). The pivotal arms (51) are respectively pivotally attached to two side of the upper cover (16). Each slidable arm (54) is slidably attached to one of the pivotal arms (51). In practice, each respective pivotal arm (51) has a channel (52) to slidably receive a rail formed on the corresponding one of the slidable arms (54). A positioning screw (541) is screwed to each respective slidable arm (54) and has a free end abutting against the corresponding one of the pivotal arms (51). With the arrangement of the positioning screws (541), the position of the slidable arms (54) relative to the pivotal arms (51) is adjustable when the free ends of the positioning screws (541) are away from the pivotal arms (51). The positioning flange (53) is L-shaped and is connected between the slidable arms (54). An upper tab (55) extends out from the positioning flange (53) and has a hook hole (56) defined in the upper tab (55).

The cable (60) is moveably received in the base (10). In practice, a cable channel (14) is defined in the top of the bottom plate (11) to receive the cable (60). The cable (60) has a first end extending out from the base (10) and provided by a hook (61) and a second end exposed from the base (10) and provided by a head (62). The hook (61) on the first end of the cable (60) is engaged on the hook hole (56) in the upper tab (55) of the positioning frame (50).

The lock assembly (30) is mounted in the base (10) and detachably locks the cable (60). The bottom plate (11) has a lock recess (113) defined in the top of the bottom plate (11), and the upper cover (16) has a lock recess (162) defined in the bottom of the upper cover (16) and corresponding to the lock recess (113) in the bottom plate (11). The lock assembly (30) is received between the lock recesses (113,162) in the bottom plate (11) and the upper cover (16). The lock assembly (30) comprises a cylinder (not numbered), a stub (31), a latch (321), an engaging element (13) and a spring (not numbered). The cylinder has a lock device mounted in the cylinder. The stub (31) is attached to the cylinder and selectively moves relative to the cylinder when the lock device in the cylinder is unlocked. The latch (321) is attached to the stub (31) and has a free end. A notch (331) is defined in the bottom near the free end of the latch (321).

The engaging element (13) is pivotally attached to the bottom plate (11) and is operationally connected to the free end of the latch (321) at a first end. In practice, the first end of the engaging element (13) is received in the notch (331) in the latch (321). Accordingly, when the latch (321) moves relative to the bottom plate (11), the first end of the engaging element (13) will be pushed by the latch (321) and the engaging element (13) will pivotally rotate relative to the bottom plate (11). The bottom plate (11) has a latch recess (12) with a bottom defined in the top of the bottom plate (11) to receive the free end of the latch (321) and the engaging element (13). The latch recess (12) communicates with the cable channel (14), such that the cable (60) penetrates through the latch recess (12). The latch recess (12) has a pivot (121) extending upward from the bottom of the latch recess (12) for the engaging element (13) being pivotally attached to the pivot (121) in the latch recess (12). The engaging element (13) has a second end abutting the cable (60). The spring is attached between the bottom plate (11) and the first end of the engaging element (13) to provide a force to push the second end of the engaging element (13) to abut against the cable (60) so as to lock the cable (60). With the abutment of the second end of the engaging element (13), the cable (60) will be held in place and will not move relative to the bottom plate (11).

In addition, the latch (321) has a pushing block (33) exposed from the front notches (112,161) in the bottom plate (11) and the upper cover (16). A second spring (32) is mounted around the stub (31) and has two ends respectively abutting the cylinder and the latch (321). The second spring (32) provides a recoil force to the latch (321) to push the latch (321) to an original position. A positioning tab (34) extends from the latch (321) and extends into the groove (22) on the post (21) to hold the positioning element (20) in the base (10) and to keep the positioning element (20) from releasing from the base (10).

Figure 4:
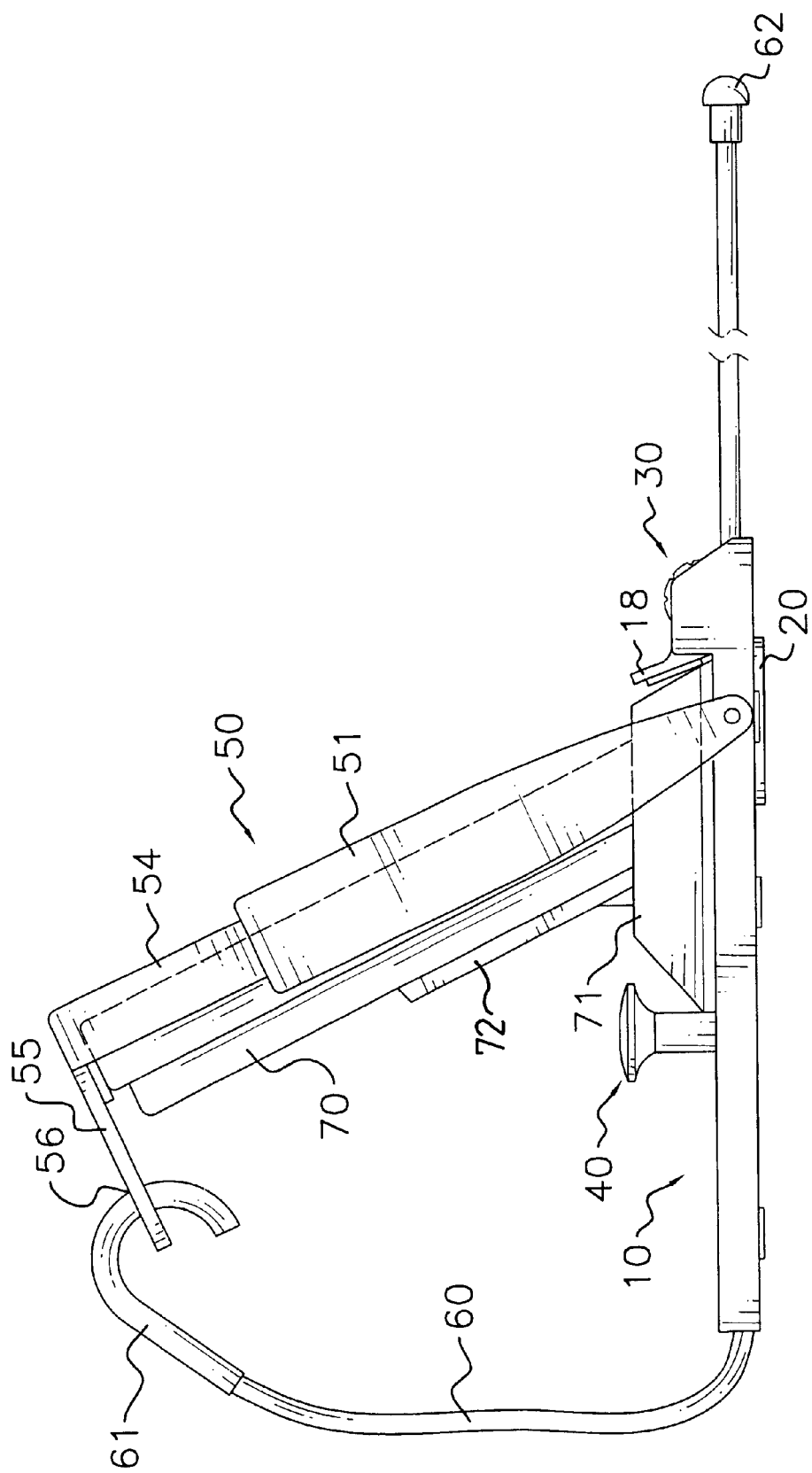
FIG. 4 is a side plan view perspective view of the locking device in FIG. 1 showing that a PDA and a charging base are put on the base and the cable is in a loose condition.
Figure 5:
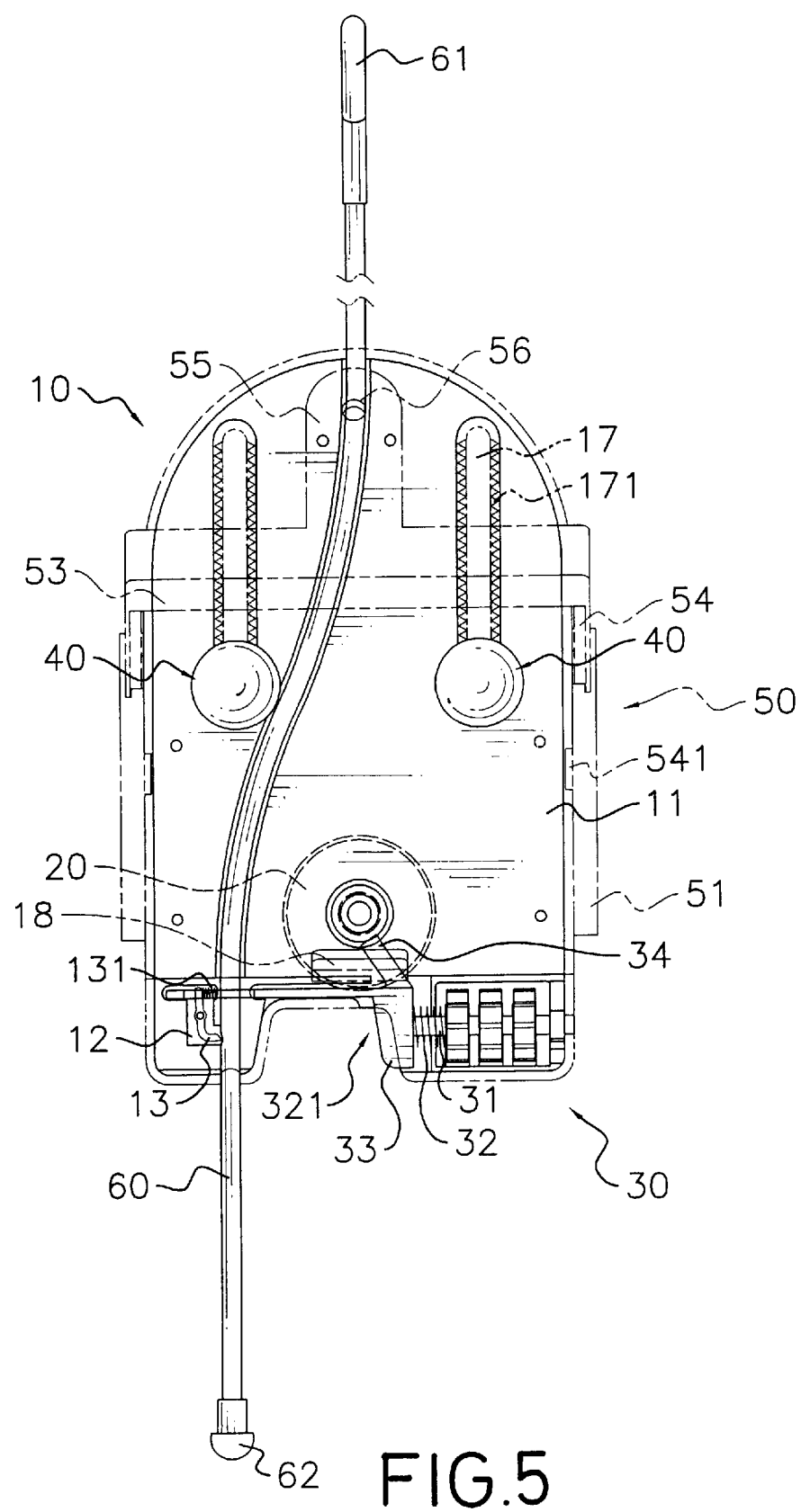
FIG. 5 is a top plan view of the base of the locking device in FIG. 1 showing that the cable is stopped by the engaging element.
Figure 6:
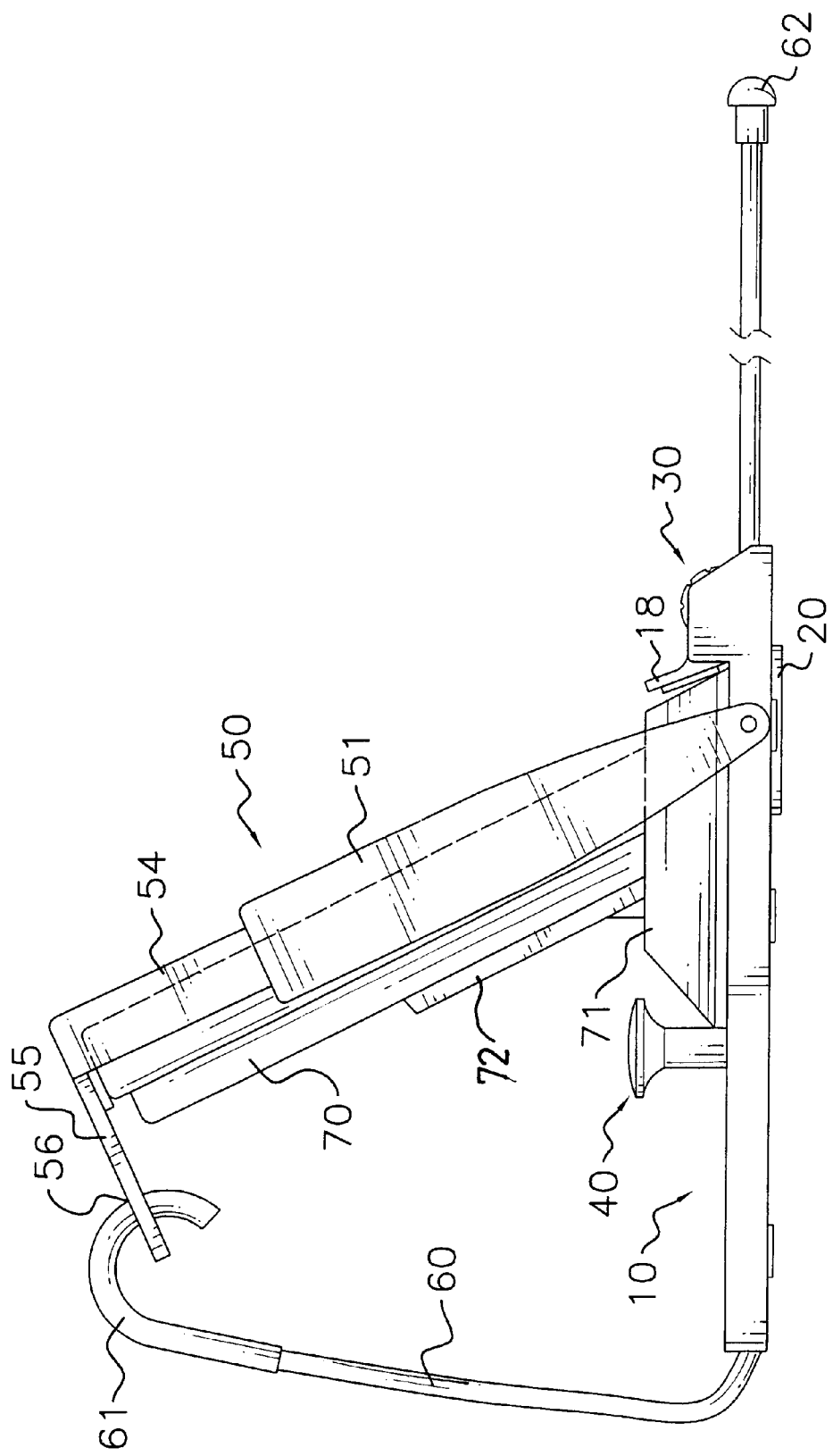
FIG. 6 is a side plan view of the locking device in FIG. 1 showing that the charging base and the PDA are securely held on the base by means of pulling the cable.

In use, with reference to FIGS. 4 to 6, the lock assembly (30) is in an unlock condition firstly. The charging base (71) is put on the base (10), and the PDA (70) is put on the charging base (71) and is supported by a holding plate (72) on the charging base (71) at a first side. One end of the charging base (71) abuts to the positioning tab (18) on the upper cover (16). The positioning knobs (40) are moved to abut the other end of the charging base (71) along the slots (171). The charging base (71) will be squeezed between the positioning tab (18) and the positioning knobs (40) when the positioning knobs (40) are securely held with the screws (42). The base (10) is securely attached to an object, such as a table with the positioning element (20). By means of the movement between the slidable arms (54) relative to the pivotal arms (51) and the pivotal rotation of the pivotal arms (51) relative to the base (10), the positioning frame (50) is rotated to a position where the L-shaped positioning flange (53) abuts the second side and the top of the PDA (70). The hook (61) on the first end of the cable (60) is engaged on the hook hole (56) in the upper tab (55). The cable (60) is pulled from the second end, such that the first end of the cable (60) connected to the positioning frame (50) will be in a tighten condition as shown in FIG. 6.

When the lock assembly (30) is switched to a lock condition, the cable (60) will be securely engage by the second end of the engaging element (13) and will not move relative to the bottom plate (11). Consequently, the positioning frame (50) will be kept in a lock condition so as to securely hold the PDA (70) and the charging base (71) on the base (10) in cooperation with the positioning tab (18) and the positioning knobs (40). Accordingly, the PDA (70) and the charging base (71) will not be unauthorizedly moved from the base (10). This can prevent money and the information stored in the PDA (70) from loss.

Figure 7:
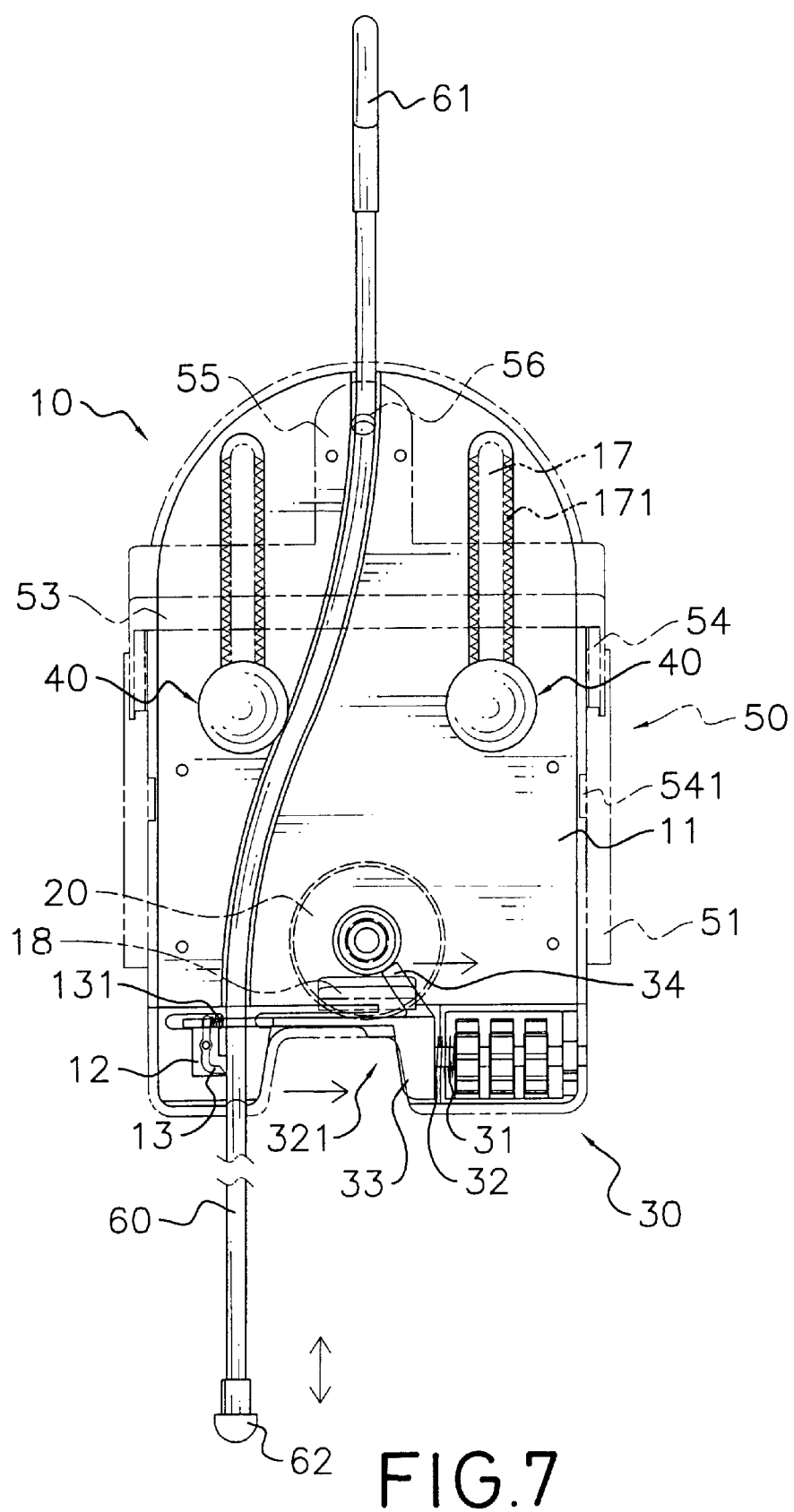
FIG. 7 is a top plan view of the base of the locking device in FIG. 1 showing that the cable is released from the engaging element by means of pushing the pushing block on the latch of the lock assembly.

When the lock assembly (30) is unlocked, with reference to FIG. 7, the stub (31) with the latch (321) can move relative to the base (10) by means of pushing the pushing block (33). Consequently, the engaging element (13) will be actuated to rotate relative to the base (10), and the second end of the engaging element (13) will leave a position abutting against the cable (60). This can release the cable (60) from the locking condition, and the cable (60) can move relative to the base (10). Accordingly, the limitation effect to the positioning frame (60) provided by the cable (60) is released by means of loosening the cable (60) as shown in FIG. 4. The PDA (70) and the charging can (710 be moved from the base (10).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for a PDA (personal digital assistant) and a charging base for the PDA, the locking device comprising:
   a base with a top and a bottom and having a positioning tab formed on the top of the base and a squeezing device moveably mounted on the top of the base to be adapted to hold the charging base in cooperation with the positioning tab;
   a positioning element attached to the bottom of the base configured for the base being attached to an object with the positioning element;
   a positioning frame pivotally attached to the base and adapted for holding the PDA, the positioning frame having a telescopic body;
   a cable moveably received in the base and having a first end extending out from the base and provided by a hook to connect to the telescopic body of the positioning frame; and
   a lock assembly mounted in the base and detachably locking the cable.

2. The locking device as claimed in claim 1, wherein the base has a bottom plate with a top and an upper cover with a top and a bottom attached to the bottom plate;
   the bottom plate has a lock recess defined in the top of the bottom plate;
   the upper cover has a lock recess defined in the bottom of the upper cover and corresponding to the lock recess in the bottom plate; and
   the lock assembly is received between the lock recesses in the bottom plate and the upper cover.

3. The locking device as claimed in claim 2, wherein the lock assembly comprises
   a cylinder with a lock device;
   a stub attached to the cylinder and selectively moving relative to the cylinder when the lock device in the cylinder is unlocked;
   a latch attached to the stub and having a free end;
   an engaging element pivotally attached to the bottom plate and operationally connected to the free end of the latch at a first end, and the engaging element having a second end; and
   a spring attached between the bottom plate and the first end of the engaging element to provide a force to push the second end of the engaging element to abut against the cable so as to lock the cable.

4. The locking device as claimed in claim 3, wherein the latch has a pushing block exposed from the base.

5. The locking device as claimed in claim 3, wherein the lock assembly further comprises a spring mounted around the stub and having two ends respectively abutting the cylinder and the latch.

6. The locking device as claimed in claim 3, wherein the bottom plate has a latch recess with a bottom defined in the top of the bottom plate to receive the free end of the latch, the latch recess having a pivot extending upward from the bottom of the latch recess; and
   the engaging element is pivotally attached to the pivot in the latch recess.

7. The locking device as claimed in claim 6, wherein a cable channel is defined in the top of the bottom plate for moveably receiving the cable and communicating with the latch recess so as to make the cable pass through the latch recess.

8. The locking device as claimed in claim 6, wherein the cable has a second end exposed from the base and provided by a head.

9. The locking device as claimed in claim 3, wherein the bottom plate has a through hole;
   the positioning element is a suction disk with a post extending upward from the suction disk and extending through the through hole in the bottom plate;
   the post has a groove defined around the post; and
   the latch has a positioning tab extending from the latch and extending into the groove on the post to hold the positioning element in the base.

10. The locking device as claimed in claim 3, wherein the latch has a bottom and a notch defined in the bottom near the free end of the latch; and
    the first end of the engaging element is received in the notch in the latch.

11. The locking device as claimed in claim 2, wherein the squeezing device comprises two positioning knobs moveably mounted on the top of the upper cover in a parallel direction.

12. The locking device as claimed in claim 11, wherein the upper cover has two parallel slots;
    the bottom plate has two elongated holes respectively corresponding to the slots in the upper cover;
    the positioning knobs are respectively slidably attached to the upper cover along the slots with a bottom; and
    a screw is screwed to the bottom of each respective positioning knob and has a head abutting the bottom of the upper cover.

13. The locking device as claimed in claim 12, wherein multiple dents are defined in the upper cover along two sides of each respective slot; and
    a tooth is formed on each side of each respective positioning knob to engage with one of the dents on a corresponding side of the corresponding one of the slots in the upper cover.

14. The locking device as claimed in claim 2, wherein the telescopic body of the positioning frame comprises:
    two pivotal arms respectively pivotally attached to two side of the upper cover;
    a slidable arm slidably attached to each respective pivotal arm; and
    an L-shaped positioning flange connected between the slidable arms to be adapted to abut the PDA.

15. The locking device as claimed in claim 14, wherein an upper tab extends out from the positioning flange and has a hook hole to engage with the hook on the cable.

16. The locking device as claimed in claim 14, wherein each respective pivotal arm has a channel; and
    each respectively slidable arm has a rail to be slidably received in the channel of the corresponding one of the pivotal arm.

17. The locking device as claimed in claim 16, wherein a positioning screw is screwed to each respective slidable arm and has a free end abutting against the corresponding one of the pivotal arms.

* * * * *